(12) United States Patent
Chen et al.

(10) Patent No.: US 12,243,656 B2
(45) Date of Patent: Mar. 4, 2025

(54) ASSEMBLY METHOD FOR A SILICON COOLING ARM

(71) Applicant: SOOCHOW UNIVERSITY, Suzhou (CN)

(72) Inventors: Tao Chen, Suzhou (CN); Kejian Ni, Suzhou (CN); Zhiying Huang, Suzhou (CN); Yuxiang Tian, Suzhou (CN); Xiandong Tian, Suzhou (CN); Wenrong Wu, Suzhou (CN); Yaping Dai, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 390 days.

(21) Appl. No.: 17/790,311

(22) PCT Filed: Nov. 23, 2021

(86) PCT No.: PCT/CN2021/132345
§ 371 (c)(1),
(2) Date: Jun. 30, 2022

(87) PCT Pub. No.: WO2022/205950
PCT Pub. Date: Oct. 6, 2022

(65) Prior Publication Data
US 2023/0044875 A1  Feb. 9, 2023

(30) Foreign Application Priority Data
Mar. 31, 2021  (CN) .......................... 202110347091.6

(51) Int. Cl.
*G21B 1/25*  (2006.01)
*B25B 27/00*  (2006.01)

(52) U.S. Cl.
CPC ................ *G21B 1/25* (2013.01); *B25B 27/00* (2013.01)

(58) Field of Classification Search
CPC .................................. B21B 1/25; B25B 27/00
See application file for complete search history.

(56) References Cited

U.S. PATENT DOCUMENTS 3,699,635 A * 10/1972  Bradley ............. B23K 37/0531
                                                       29/272
4,707,900 A * 11/1987  Twogood ................ B25B 27/06
                                                       29/244

(Continued)

FOREIGN PATENT DOCUMENTS

| CN | 201483440 U | 5/2010 |
|---|---|---|
| CN | 210335785 U | 4/2020 |

(Continued)

OTHER PUBLICATIONS

English Abstract DE-102008057413-A1 (Year: 2009).*

*Primary Examiner* — Sarang Afzali
(74) *Attorney, Agent, or Firm* — SZDC Law PC (57) ABSTRACT

An assembly method for a silicon cooling arm that connects a cool source to an aluminum sleeve of a cryogenic target includes a bulb of a strut (2) preset in an arc-shaped groove (5-3) of a rotary table (5). Additionally, a first section (3-1) of a connecting shaft (3) is inserted into a center insertion hole (5-2) of the rotary table (5). A second section of the connecting shaft (3) is attached to an upper surface of a disk body (5-1). A coaxial connector (4) and a strut stop (1) are sheathed on the connecting shaft (3). A recessing (2-2) of the strut (2) is fitted onto a boss (1-2) of the groove in the strut stop (1). Finally, a fifth section (3-5) of the connecting shaft (3) is inserted into a hollow part in a hollow disk body (1-1) of the strut stop (1).

7 Claims, 8 Drawing Sheets

(56) References Cited

U.S. PATENT DOCUMENTS

| | | | | |
|---|---|---|---|---|
| 5,419,027 | A | * | 5/1995 | McPeak ................ B25B 27/023 29/261 |
| 6,609,283 | B1 | * | 8/2003 | Somerville ........... B25B 27/023 29/261 |
| 7,010,840 | B2 | * | 3/2006 | Reale .................... B25B 27/062 29/263 |
| 9,027,217 | B2 | * | 5/2015 | Cranford ................ E21B 19/00 166/85.4 |
| 9,308,346 | B2 | * | 4/2016 | Soundararajan .......... A61F 2/95 |
| 2003/0135992 | A1 | * | 7/2003 | Ma ......................... B25B 27/02 29/762 |

FOREIGN PATENT DOCUMENTS

| | | | | |
|---|---|---|---|---|
| CN | 111300302 | A | | 6/2020 |
| CN | 113183080 | A | | 7/2021 |
| DE | 102008057413 | A1 | * | 10/2009 ........... B23P 19/086 |
| DE | 102015105562 | B3 | | 10/2016 |

* cited by examiner

ASSEMBLY METHOD FOR A SILICON COOLING ARM

This application is the National Stage Application of PCT/CN2021/132345, filed on Nov. 23, 2021, which claims priority to Chinese Patent Application No. 202110347091.6, filed on Mar. 31, 2021, which is incorporated by reference for all purposes as if fully set forth herein.

TECHNICAL FIELD

This application relates to mechanical precision machining, and in particular to an assembly method for a silicon cooling arm.

BACKGROUND

The cryogenic target is an important target type to achieve high inertial confinement fusion energy gain. The cooling arm connected the cool source to the aluminum sleeve is an important part of the cryogenic target, which is used to obtain accurate temperature field for the deuterium-tritium ice shell, and uniformly clamp the aluminum sleeve. Experiments show that the silicon material is excellent to fabricate cooling arm. In the inertial confinement fusion (ICP) experiment, the silicon cooling arm is coordinated with aluminum sleeve by interference fit, and a plurality of secondary bifurcated clamping arms of the silicon cooling arm are required to tightly clamp the surface of the aluminum sleeve, Currently, the assembly of the silicon cooling arm and the aluminum sleeve is almost manually installed, and the installation accuracy and efficiency are difficult to meet the requirements of inertial confinement fusion experiment, moreover, due to the weak perception of human skin to tiny forces, the surface damage and structure damage of silicon cooling arm are often caused during assembly.

In addition, through searching of patent literature, books and periodicals literatures, there are no relevant reports about mechanized assembly of cooling arm and aluminum sleeve.

SUMMARY

It is therefore an object of this invention to provide an assembly method for a silicon cooling arm.

The technical scheme of this application is as follows:

an assembly method for silicon cooling arm, comprising:

S1. presetting the bulb of the strut (2) in the arc-shaped groove (5-3) of the rotary table (5);

S2. inserting the first section (3-1) of the connecting shaft (3) into the center insertion hole of the rotary table (5-2), attaching the second section of the connecting shaft (3) to the upper surface of the disk body (5-1);

S3. sheathing the coaxial connector (4) on the connecting shaft (3), wherein the strut (2) passes through the radial slot (4-3) of the coaxial connector (4), the fifth section (3-5) and the fourth section (3-4) of the connecting shaft (3) sequentially pass through the center insertion hole of the coaxial connector (4-2), the strut (2) passes through the radial slot (4-3) of the coaxial connector (4), the third section (3-3) of the connecting shaft (3) attaches to the lower surface of the disk body of the coaxial connector (4-1);

S4. sheathing the strut stop (1) on the connecting shaft (3), fitting the recessing (2-2) of the strut (2) onto the boss (1-2) in the standing groove of the strut stop (1), fitting the recessing (2-2) of the each strut (2) onto the corresponding bosses (1-2) in the standing grooves of the strut stop (1).

inserting the fifth section (3-5) of the connecting shaft (3) into the hollow part in the hollow disk body (1-1) of the strut stop (1), attaching the fourth section (3-4) of the connecting shaft (3) to the lower surface of the hollow disk body (1-1), fitting the recessing (2-2) of the each strut (2) onto the corresponding bosses (1-2) in the standing grooves of the strut stop (1).

Furthermore, the structure assembled in the aforesaid S1-S3 steps is an opening device of the secondary bifurcated clamping arms, which comprises:

strut stop (1), comprising a hollow disk body (1-1), a plurality of standing grooves arranging evenly in the outer circumferential direction of the hollow disk body (1-1), and the bosses (1-2) setting in the standing grooves;

strut (2), comprising strut body (2-1), recessing (2-2) setting in the strut body (2-1), bulb (2-3) setting at the lower end of the strut (2);

connecting shaft (3), comprising a third section (3-3), a fourth section (3-4), a fifth section (3-5), wherein the radiuses of the circular sections for the three sections decrease successively;

coaxial connector (4), comprising a disk body of the coaxial connector (4-1), a center insertion hole of the coaxial connector (4-2), a plurality of radial slots (4-3), wherein the radial slot is rectangular, the center insertion hole of the coaxial connector (4-2) is set at the center of the disk body of the coaxial connector (4-1), the radial slots (4-3) are distributed in an annular array on the disk body of the coaxial connector (4-1), the length direction of the radial slots (4-3) is the radial direction of the disk body of the coaxial connector (4-1), the fourth section (3-4) of the connecting shaft (3) adapts to the center insertion hole of the coaxial connector (4-2) according to shape, and the strut stop (1) is sheathed on the fifth section (3-5) of the connecting shaft (3), and the coaxial connector (4) is sheathed on the fourth section (3-4) of the connecting shaft (3);

rotary table (5), comprising a disk body of the rotary table (5-1), a plurality of arc-shaped grooves (5-3), wherein the arc-shaped grooves are arranged in an annular array around the center of the disk body of the rotary table (5-1), the strut bulb is rotatably disposed in the arc-shaped groove, the strut passes through the radial slot (4-3) of the coaxial connector to set in the standing groove of the strut stop (1), and the recessing of the strut (2) fits the boss of the strut stop (1);

wherein the structure of the arc-shaped groove (5-3) is set in the way that the distance between the bulb (2-3) and the center of the rotary table (5) monotonically increases or decreases when the bulb (2-3) moves from the one end to the other end of the arc-shaped groove (5-3).

In addition, the rotary table further comprises a center insertion hole of the rotary table (5-2) setting at the center of the disk body of the rotary table (5-1), wherein the shapes of the center insertion hole of the rotary table (5-2) and the fifth section (3-5) of the connecting shaft adapts to each other according to shape.

Moreover, the connecting shaft (3) comprises a first section (3-1), a second section (3-2), a third section (3-3), a fourth section (3-4), and a fifth section (3-5) which are connected in sequence; all of the five sections are cylinder, and their central axial are overlapped; the radius of circular section for the second section (3-2) is greater than both that for the first section (3-1) and the third section (3-3); the fifth section (3-5) can be inserted into the hollow disk (1-1).

Furthermore, the number of the standing grooves in the strut stops (1) is the same with that of the struts, the radial slots (4-3), and the arc-shaped grooves.

Additionally, the boss (1-2) and the recessing (2-2) can adapt to each other according to shape, which are both arc-shaped.

Furthermore, the boss (1-2) and the recessing (2-2) are both semi-circles.

In addition, the shape of the arc-shaped groove is circular arc.

The advantage of this disclosure is:

firstly, the opening device of the secondary bifurcated clamping arms could solve the problem of inconsistent force that the 12 struts applied on the clamping arms due to the processing error, moreover, this device could be driven by the motor through the lever and cam mechanism, and the opening accuracy of the each strut could be improved to the minimum of 1 μm, in addition, this device could be used for the silicon cooling arm with more secondary bifurcated clamping arms after a slightly modification on its part's size, besides that, through the limitation of the position and the length of the rectangle hole on the coaxial connector, this device could avoid the secondary bifurcated clamping arms being damaged by the huge applied force, thereby effectively protecting the silicon arm, secondly, the spirit of the present invention is: "the strut stop (1), the coaxial connector (4), and the rotary table are all arranged on the cylindrical-shaped connecting shaft (3), a plurality of radial slots are set on the coaxial connector (4), a plurality of arc-shaped grooves are set on the rotary table (5), and the structure of the arc-shaped groove (5-3) is set in the way that the distance between the bulb (2-3) and the center of the rotary table monotonically increases or decreases when the bulb (2-3) moves along one end to the other end of the arc-shaped groove (5-3), the bulb of the strut is disposed in the arc-shaped groove, and the strut passes through radial slot, the upper part of the strut (not including the top part that goes outside the strut stop) is hinged to the strut stop." The above design works as a whole to achieve the function of the secondary bifurcated clamping arm of the silicon cooling arm.

BRIEF DESCRIPTION OF THE DRAWINGS

The following drawings of the embodiments are used to clarify this invention but shall not limit the scope of this invention.

The reference numbers of FIGS. 1-9 are illustrated as follows:

strut stop 1, strut 2, connecting shaft 3, coaxial connector 4, rotary table 5;

hollow disk body1-1, boss 1-2, cut piece 1-3;

strut body 2-1, recessing 2-2, bulb 2-3;

first section 3-1, second section 3-2, third section 3-3, fourth section 3-4, fifth section 3-5;

disk body of the coaxial connector 4-1, center insertion hole of the coaxial connector 4-2, radial slot 4-3;

disk body of the rotary table 5-1, center insertion hole of the rotary table 5-2, arc-shaped groove 5-3.

DETAILED DESCRIPTION OF THE INVENTION

Figure 1:
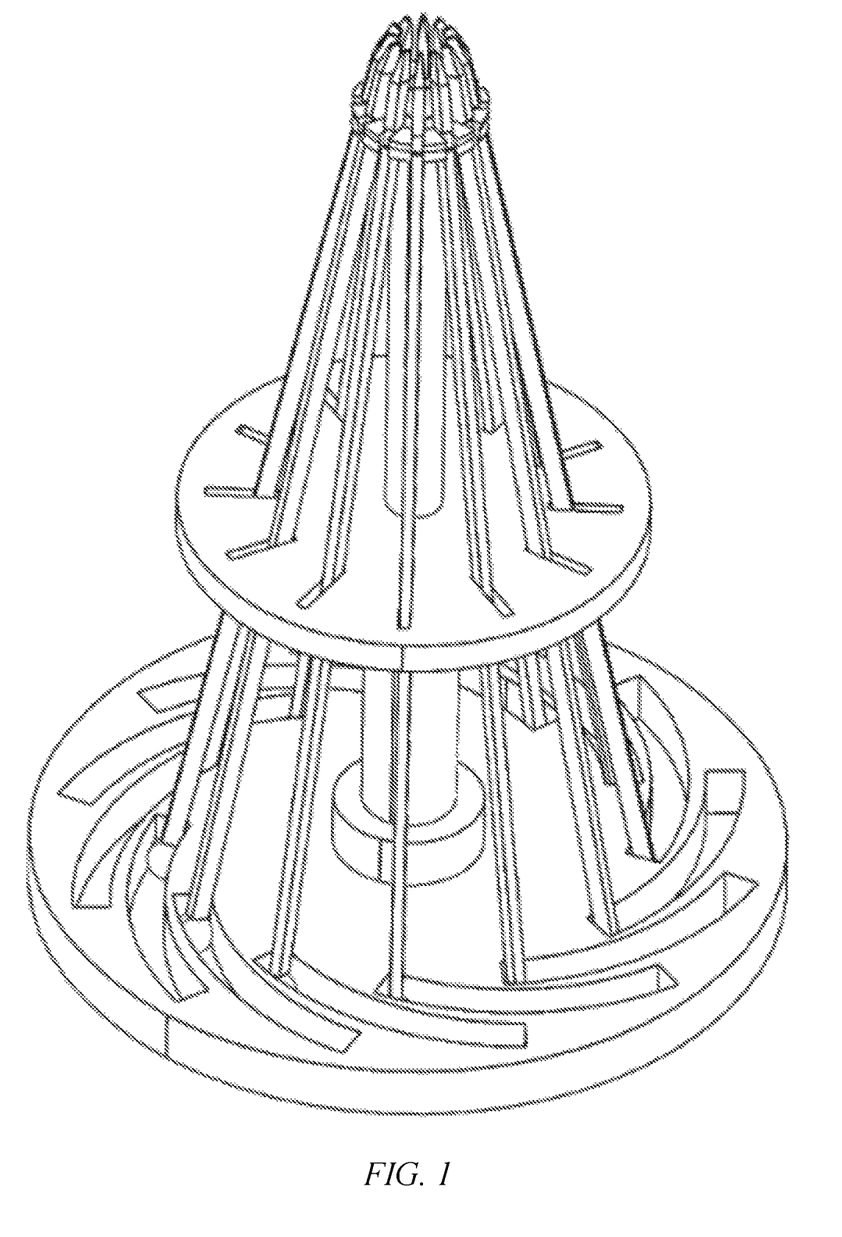
FIG. 1 is the overall schematic for the opening device of the secondary bifurcated clamping arms of the silicon cooling arm.

As shown in FIG. 1, the opening device of the secondary bifurcated clamping arms comprises strut stops 1, struts 2, a connecting shaft 3, a coaxial connector 4, and a rotary table 5.

The strut stop 1 comprises a hollow disk 1-1, bosses 1-2, cut pieces 1-3, wherein the bosses and the cut pieces are arranged evenly in the circumferential direction of the hollow disk 1-1, and the bosses 1-2 alternate with the cut pieces 1-3; the space formed between the adjacent cut pieces 1-3 is the standing groove where the bosses 1-2 are set.

The strut 2 comprises a strut body 2-1, a recessing 2-2, and a bulb 2-3, wherein the recessing 2-2 is set on the top of the strut body 2-1, and the recessing 2-2 adapts to the boss 1-2 according to shape; the bulb 2-3 is set at the lower end of the strut 2.

The connecting shaft 3 comprises a first section 3-1, a second section 3-2, a third section 3-3, a fourth section 3-4, and a fifth section 3-5, wherein the five sections are connected in sequence;

all of the five sections are cylinder, and their central axial are overlapped; the radius of circular section for the second section 3-2 is greater than both that for the first section 3-1 and the third section 3-3;

the radiuses of the circular sections for the third section 3-3, the fourth section 3-4, and the fifth section 3-5 decrease successively; the fifth section 3-5 can be inserted into the hollow disk 1-1, that is, the fifth section 3-5 adapts to the hollow disk 1-1 according to shape, (that is, their radiuses match each other).

The coaxial connector 4 comprises a disk body of the coaxial connector 4-1, a center insertion hole of the coaxial connector 4-2, a plurality of rectangular radial slots 4-3, wherein the center insertion hole of the coaxial connector is set at the center of the disk body of the coaxial connector 4-1, the radial slots 4-3 are distributed in an annular array on the disk body of the coaxial connector 4-1, the length direction of the radial slots 4-3 is the radial direction of the disk body of the coaxial connector 4-1, the fourth section 3-4 of the connecting shaft 3 adapts to the center insertion hole of the coaxial connector 4-2 according to shape (that is, their radiuses match each other).

The rotary table 5 comprises a disk body of the rotary table 5-1, a center insertion hole of the rotary table 5-2 setting at the center of the disk body of the rotary table 5-1, a plurality of arc-shaped groove 5-3, wherein the arc-shaped grooves are arranged in an annular array around the center of the disk body of the rotary table 5-1, the fifth section 3-5 of connecting shaft 3 adapts to the center insertion hole of the rotary table 5-2 according to shape (that is, their radiuses match each other).

Figure 2:
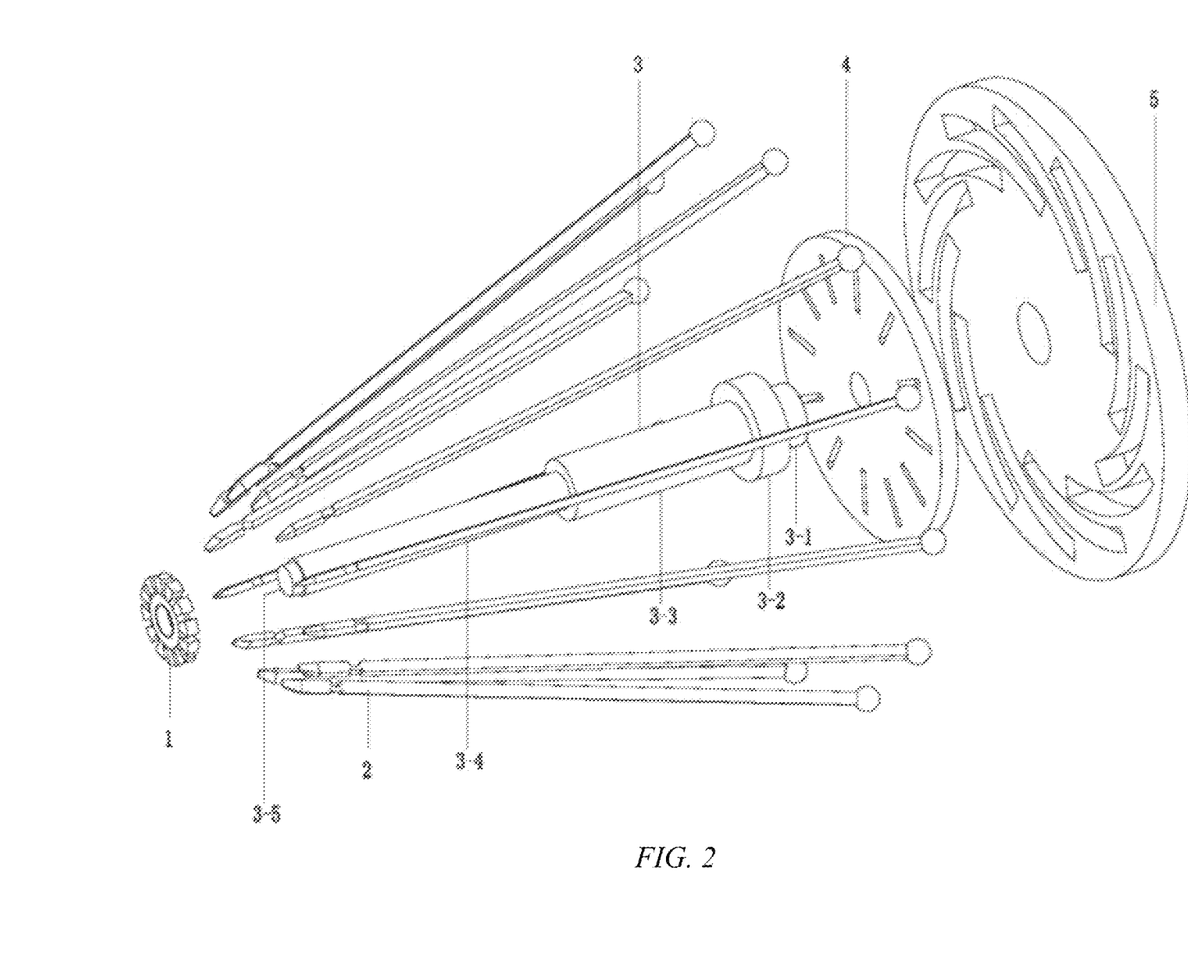
FIG. 2 is an exploded perspective view for the opening device of the secondary bifurcated clamping arms of the silicon cooling arm
Figure 3:
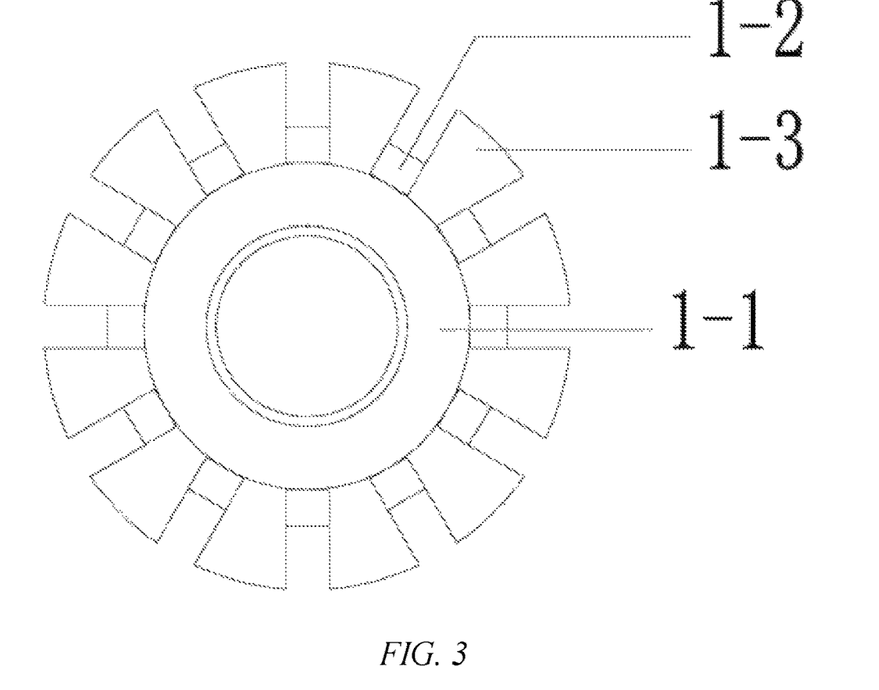
FIG. 3 is a top view for the strut stop.
Figure 4:
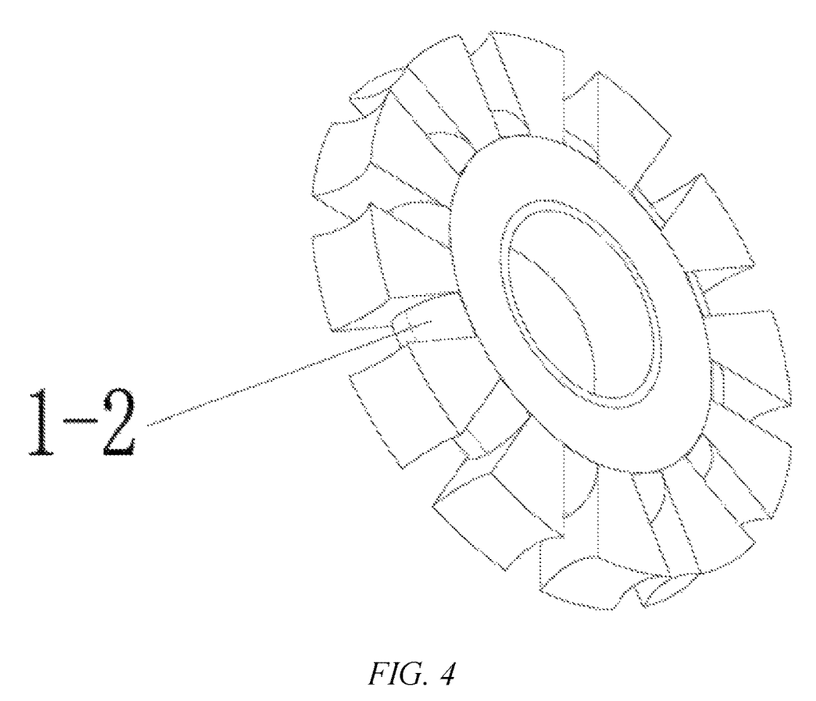
FIG. 4 is a three-dimensional design diagram for the strut stop.
Figure 5:
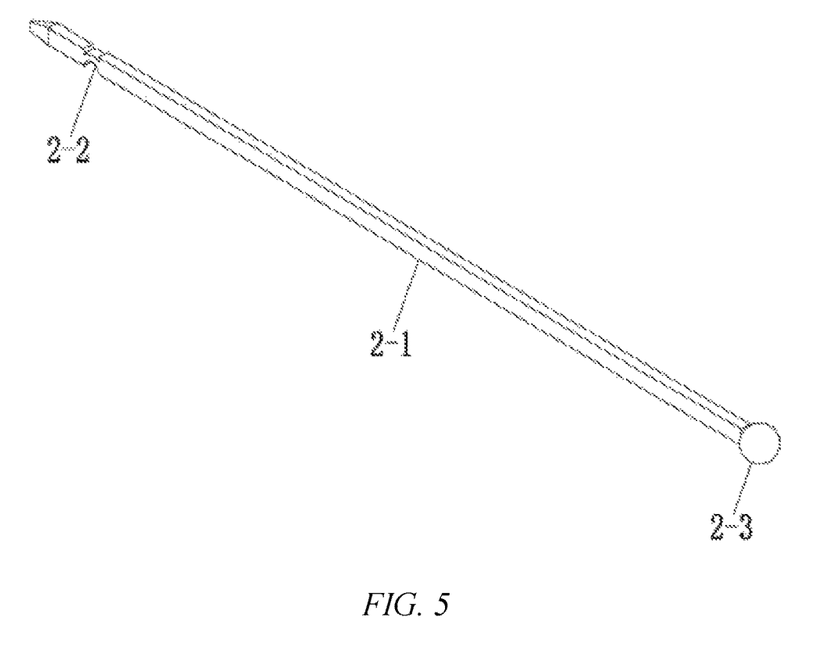
FIG. 5 is a three-dimensional design diagram for the strut.
Figure 6:
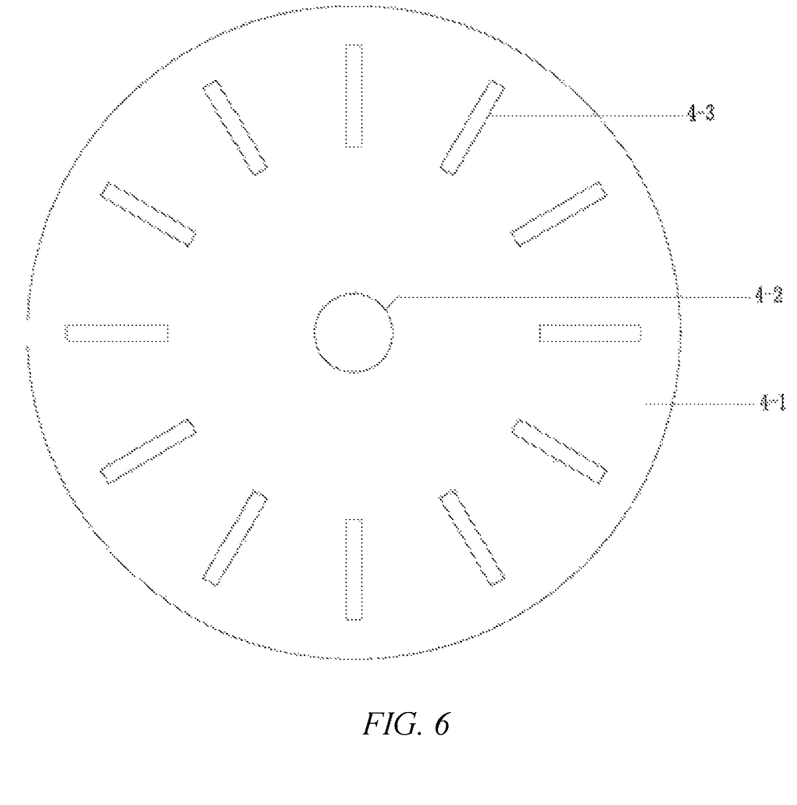
FIG. 6 is a top view for the coaxial connector.
Figure 7:
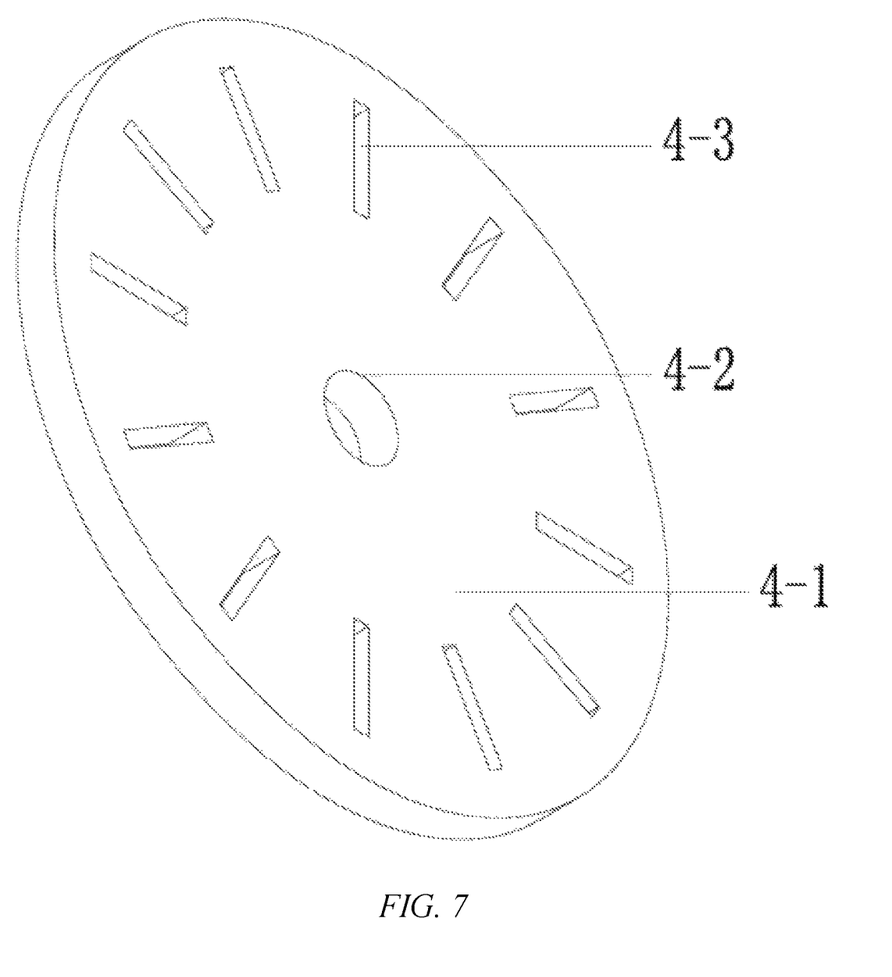
FIG. 7 is a three-dimensional design diagram for the coaxial connector
Figure 8:
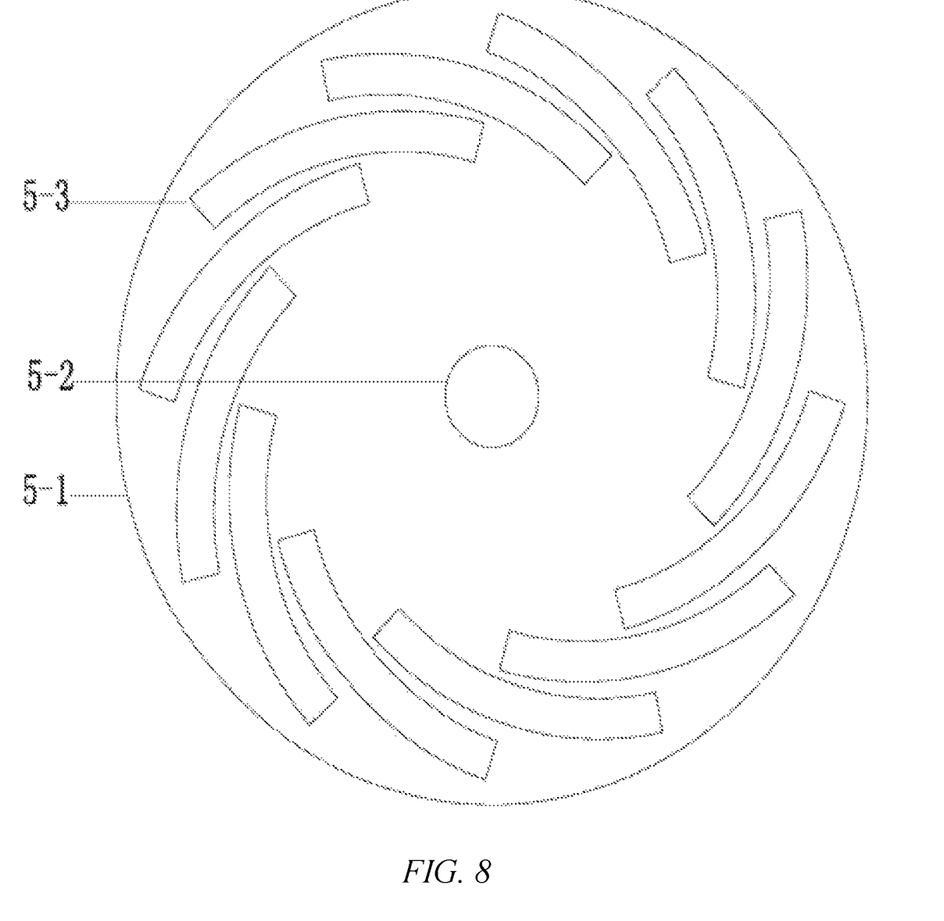
FIG. 8 is a top view for the rotary table.
Figure 9:
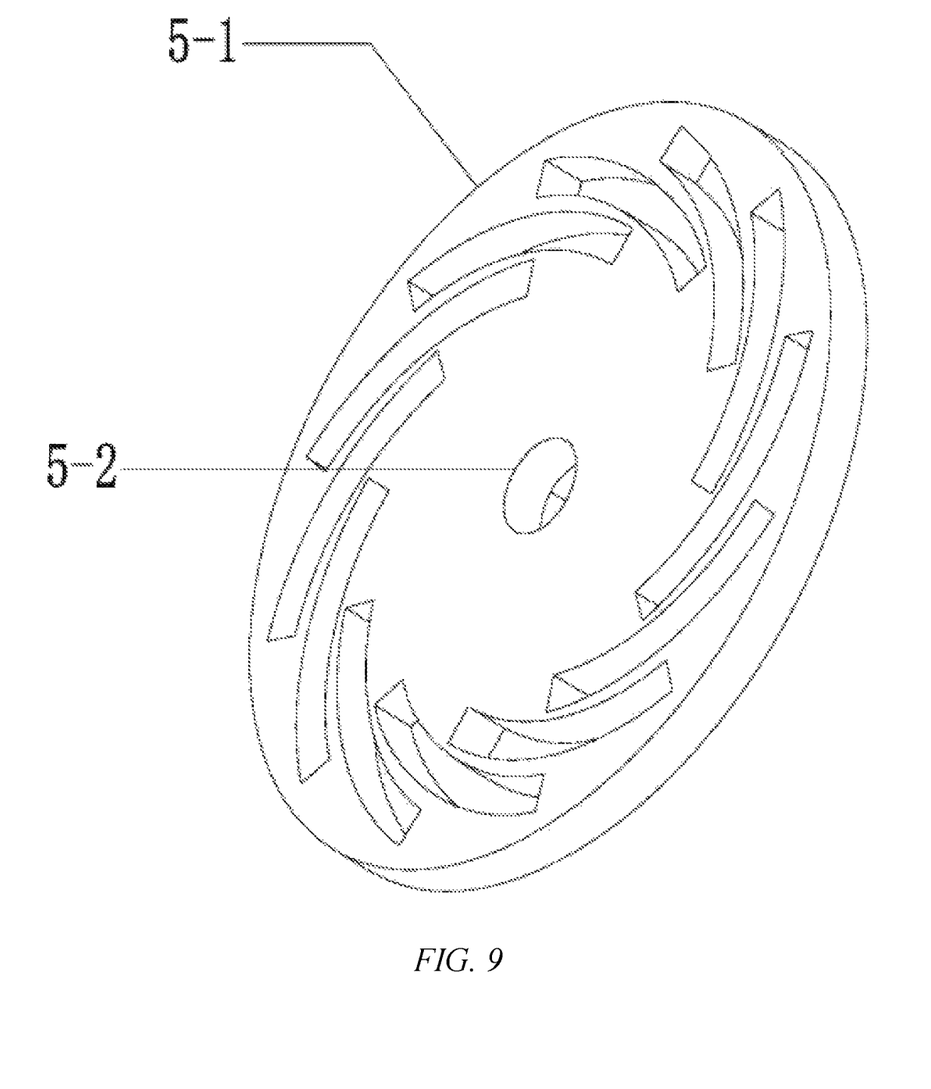
FIG. 9 is a three-dimensional design diagram for the rotary table
Figure 10:
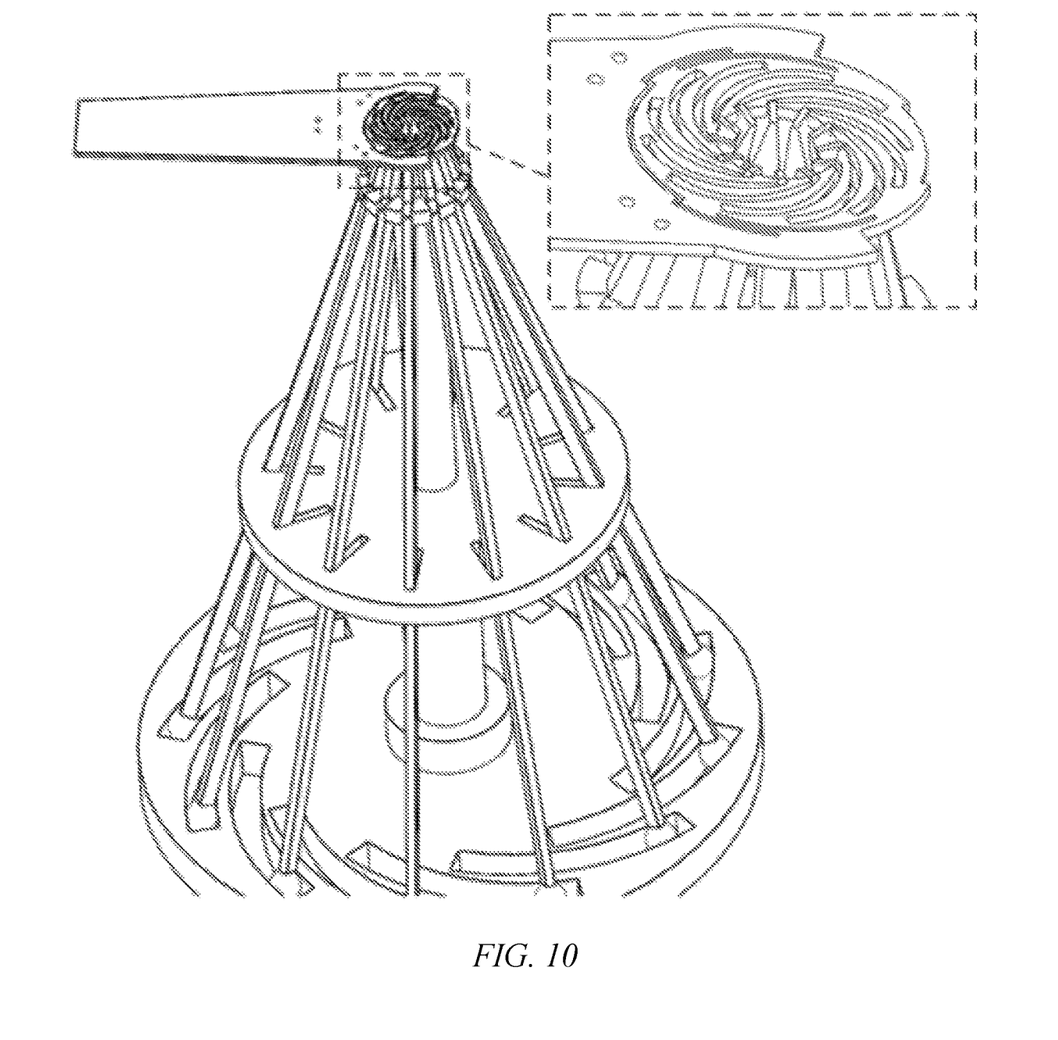

As shown in FIG. 1-2, the number of the standing grooves in the strut stops 1 is 12, and the number of the struts is 12 which are corresponding to the 12 notches of the strut stop and the coaxial connector; in addition, the number of the radial slots is 12, and the number of the arc-shaped grooves is 12 as well, that is, the number of the standing grooves in strut stop 1 is the same with that of the struts 2, radial slots 4-3 and the arc-shaped grooves 5-3.

The bulb of the strut 2 is rotatably disposed in the arc-shaped groove 5-3, that is, the bulb could only move along the arc-shaped groove 5-3, but couldn't be pulled out from it.

Furthermore, the boss 1-2 is semi-circular, as well as the recessing 2-2 (that is, the strut could rotate around the strut stop, substantially, the angle between the strut and the coaxial connector varies).

The mechanism for the secondary bifurcated clamping arm of the cooling arm is as follows:

firstly, the bulbs of the struts snap into the corresponding arc-shaped grooves of the rotary table, and the recessing 2-2 at the upper top of each strut is sheathed on the boss 1-2 of the strut stop;

secondly, the strut stop 1, the coaxial connector 4, the rotary table 5 are connected together by the connecting shaft 3, which limits the upper and lower displacement;

thirdly, the strut 2, the connecting shaft 3, the standing grooves of the strut stop 1, the radial slot 4-3 of the coaxial connector 4, and the arc-shaped groove 5-3 limit the rotation of the strut;

specifically, when the bulb 2 moves along the arc-shaped groove, the distance between the strut stop 1 and the rotary table would change, and meanwhile the strut stop 1 would rotate to some extent; correspondingly, the distance between the coaxial connector and the rotary table would be changed, and the coaxial connector would be rotated.

The installation method for the secondary bifurcated clamping arms is as follows:

S1. presetting the bulb of the strut 2 in the arc-shaped groove 5-3 of the rotary table 5;

S2. inserting the first section 3-1 of the connecting shaft 3 into the center insertion hole of the rotary table 5-2, attaching the second section of the connecting shaft 3 to the upper surface of the disk body 5-1;

S3. sheathing the coaxial connector 4 on the connecting shaft 3, wherein the strut 2 passes through the radial groove 4-3 of the coaxial connector 4, the fifth section 3-5 and the fourth section 3-4 of the connecting shaft 3 sequentially pass through the center insertion hole of the coaxial connector 4-2, and the third section 3-3 of the connecting shaft 3 is attached to the lower surface of the disk body of the coaxial connector 4-1;

S4. sheathing the strut stop 1 on the connecting shaft 3, fitting the recessing 2-2 of the strut 2 onto the boss 1-2 in the standing groove of the strut stop 1, inserting the fifth section 3-5 of the connecting shaft 3 into the hollow part in the hollow disk 1-1 of the strut stop 1, attaching the fourth section 3-4 of the connecting shaft 3 to the lower surface of the hollow disk 1-1;

fitting each recessings 2-2 of the struts 2 onto each boss 1-2 in the standing grooves of the strut stop 1.

When the secondary bifurcated clamping arm of the silicon cooling arm in the present invention works, the motor drives the rotary table into rotation, and the bulb moves along the arc-shaped groove of the rotary table to allow the umbrella frame structure consisting of the 12 struts to open and close (the angle between the strut and the connecting shaft varies correspondingly), thereby the opening of the secondary bifurcated clamping arms could be achieved; moreover, in the aforesaid process, the distance between the opening device and the silicon cooling arm could be adjusted as user designed to avoid the opening device interfering the subsequent assembly process.

The strut could rotate around the strut stop through the variation of its inclination and rotate in the arc-shaped groove through its bulb, which performs as a secondary level amplifying function. Therefore, the error caused by the processing and manually controlling could be great improved, and the forces on the 12 struts of the opening device maintaining at a same standard level could be ensured during assembly.

The above is only the preferred embodiments of the present invention, and not makes any formal limitation to the present invention. It should be further understood by those skilled in the art that various changes and modifications may be made without departing from the spirit of the invention are protected by this invention. Therefore, the scope of protection for this invention shall be subject to the appended claims.

What is claimed is:

1. An assembly method for a silicon cooling arm that connects a cool source to an aluminum sleeve of a cryogenic target, the method comprising:

providing a strut stop (1), wherein the strut stop (1) comprises a hollow disk body (1-1), a plurality of cut pieces (1-3), a plurality of standing grooves formed and arranged between a pair of adjacent cut pieces and a plurality of bosses (1-2), each boss is set in one of the plurality of standing grooves;

providing a plurality of struts (2), wherein each strut comprises a strut body (2-1), a recessing (2-2), and a bulb (2-3);

providing a cylindrical-shaped connecting shaft (3), wherein the connecting shaft comprises a first section (3-1), a second section (3-2), a third section (3-3), a fourth section (3-4) and a fifth section (3-5);

providing a coaxial connector (4), wherein the coaxial connector (4) comprises a disk body (4-1) having a center insertion hole (4-2) and a plurality of radial slots (4-3);

providing a rotary table (5), wherein the rotary table (5) comprises a disk body (5-1) having a center insertion hole (5-2) and a plurality of arc-shaped grooves (5-3);

S1, presetting the bulb (2-3) of each of the plurality of struts (2) in a corresponding arc-shaped groove of the plurality of arc-shaped grooves (5-3) of the rotary table (5);

S2, inserting the first section (3-1) of the connecting shaft (3) into the center insertion hole (5-2) of the rotary table (5), attaching the second section (3-2) of the connecting shaft (3) to an upper surface of the disk body (5-1);

S3, sheathing the coaxial connector (4) on the connecting shaft (3), wherein each of the plurality of struts (2) passes through a corresponding radial slot of the plurality of radial slots (4-3) of the coaxial connector (4), the fifth section (3-5) and the fourth section (3-4) of the connecting shaft (3) sequentially pass through the center insertion hole (4-2) of the coaxial connector (4), each of the plurality of struts (2) passes through the corresponding radial slot of the plurality of radial slots (4-3) of the coaxial connector (4), the third section (3-3) of the connecting shaft (3) attaches to a lower surface of the disk body (4-1) of the coaxial connector (4); and S4, sheathing the strut stop (1) on the connecting shaft (3), fitting the recessing (2-2) of each of the plurality of struts (2) onto a corresponding boss (1-2) of the plurality of bosses (1-2) arranged in the plurality of standing grooves in the strut stop (1), inserting the fifth section (3-5) of the connecting shaft (3) into a hollow part in the hollow disk body (1-1) of the strut stop (1), attaching the fourth section (3-4) of the connecting shaft (3) to a lower surface of the hollow disk body (1-1), fitting the recessing (2-2) of each of the strut plurality of struts (2) onto a corresponding boss (1-2) of the plurality of bosses (1-2) arranged in the standing grooves of the strut stop (1).

2. The assembly method of claim 1, wherein a structure assembled in the aforesaid S1-S4 steps is an opening device of a secondary bifurcated clamping arm, wherein the plurality of standing grooves are arranged evenly in an outer circumferential direction of the hollow disk body (1-1), wherein the recessing (2-2) is set in the strut body (2-1), the bulb (2-3) is set at a lower end of the strut (2), wherein radiuses of circular cross sections of the third section (3-3), the fourth section (3-4) and the fifth section (3-5) of the connecting shaft (3) decrease successively, wherein each of the plurality of radial slots is rectangular, the center insertion hole (4-2) of the coaxial connector (4) is set at a center of the disk body (4-1) of the coaxial connector (4), the plurality of radial slots (4-3) are distributed in an annular array on the disk body (4-1) of the coaxial connector (4), a length direction of each of the plurality of radial slots (4-3) is a radial direction of the disk body (4-1) of the coaxial connector (4), the fourth section (3-4) of the connecting shaft (3) adapts to the center insertion hole (4-2) of the coaxial connector (4) according to shape, and the strut stop (1) is sheathed on the fifth section (3-5) of the connecting shaft (3), and the coaxial connector (4) is sheathed on the fourth section (3-4) of the connecting shaft (3);

wherein the plurality of the arc-shaped grooves (5-3) are arranged in an annular array around a center of the disk body (5-1) of the rotary table (5), each of the plurality of strut bulbs (2-3) is rotatably disposed in the corresponding arc-shaped groove of the plurality of arc-shaped grooves (5-3), each of the plurality of struts (2) passes through the corresponding radial slot of the plurality of radial slots (4-3) of the coaxial connector (4) to set in the corresponding standing groove of the plurality of standing grooves of the strut stop (1), wherein each of the recessing (2-2) of the strut (2) fits the corresponding boss of the plurality of bosses (1-2) of the strut stop (1);

wherein a structure of each of the plurality of arc-shaped grooves (5-3) is set in a way that a distance between the bulb (2-3) and a center of the rotary table (5) monotonically increases or decreases when the bulb (2-3) moves from one end to another end of the arc-shaped groove (5-3).

3. The assembly method of claim 2, wherein the center insertion hole (5-2) is set at a center of the disk body (5-1) of the rotary table (5), wherein the center insertion hole (5-2) of the rotary table (5) and the fifth section (3-5) of the connecting shaft (3) have matching shapes.

4. The assembly method of claim 2, wherein a total number of the plurality of standing grooves in the strut stop (1) equal to a total number of the plurality of struts (2), the plurality of radial slots (4-3), and the plurality of arc-shaped grooves (5-3).

5. The assembly method of claim 2, wherein the boss (1-2) and the recessing (2-2) have matching arc-shaped shapes.

6. The assembly method of claim 5, wherein the shapes of the boss (1-2) and the recessing (2-2) are both semi-circles.

7. The assembly method of claim 2, wherein the first section (3-1), the second section (3-2), the third section (3-3), the fourth section (3-4), and the fifth section (3-5) of the connecting shaft (3) are connected in sequence; all of the five sections are cylindrical-shaped and coaxial with one another; a radius of the second section (3-2) is greater than a radius of the first section (3-1) and a radius of the third section (3-3); the fifth section (3-5) is inserted into the hollow disk body (1-1).

* * * * *